United States Patent [19]

Sakakibara

[11] Patent Number: 4,623,899
[45] Date of Patent: Nov. 18, 1986

[54] RECORDING APPARATUS

[75] Inventor: Kenzo Sakakibara, Yokohama, Japan

[73] Assignee: Canon Kabushiki Kaisha, Tokyo, Japan

[21] Appl. No.: 716,806

[22] Filed: Mar. 27, 1985

[30] Foreign Application Priority Data

Apr. 3, 1984 [JP] Japan .................................. 59-65076

[51] Int. Cl.⁴ ............................................ G01D 15/10
[52] U.S. Cl. ................................ 346/76 PH; 400/120; 400/54
[58] Field of Search ................. 219/216 PH, 485, 486, 219/492; 346/76 PH, 76 R, 154; 400/120, 54

[56] References Cited

FOREIGN PATENT DOCUMENTS 0100173 7/1980 Japan .............................. 346/76 PH Primary Examiner—Arthur G. Evans
Attorney, Agent, or Firm—Fitzpatrick, Cella, Harper & Scinto

[57] ABSTRACT

A recording apparatus includes a record head which performs a record operation on a record medium and a drive signal generator that which drives the record head. Continuous generation of the drive signal is limited by a limiter.

10 Claims, 5 Drawing Figures

RECORDING APPARATUS

BACKGROUND OF THE INVENTION

1. Field of the Invention

The present invention relates generally to a recording apparatus which records characters, images or the like on a record medium, and more particularly to a recording apparatus which has a plurality of recording elements.

2. Description of the Prior Art

As a recording apparatus of the above type, a thermal-sensitive printer is known which uses as a recording head a thermal head composed of a multiplicity of heater elements arranged in a line.

FIG. 1 illustrates one example of the structure of the thermal head with a driver therefor. In the figure, reference characters R1-R1,728 denote 1,728 such heater elements arranged in a line, thereby constituting a thermal head. One end of each of the heater elements R1-R1,728 is connected to a common terminal C and the other end of each heater element is connected to the output of a corresponding one of AND gates A1-A1,728 which are grouped into 4 blocks in the order in which the gates are arranged. One input to each of the blocks is connected in parallel with signal lines B1-B4 while the other input is connected in parallel with a shift register and latch circuit 100.

The shift register and latch circuit 100 includes a 1,728-bit shift register which sequentially shifts and stores recorded data transferred in series via a signal line S1, and a latch circuit which latches the data stored in the shift register. It has signal lines S1-S3 connected to its input.

Recording will be performed by use of the above structure as follows: First, a record data signal DIN is input in series via the signal line S1 to the shift register latch circuit 100. A shift clock signal SCLK to shift the data is input via the signal line S2. The input data are shifted sequentially from left to right through the shift register by the shift clock signal SCLK.

In this way, when transfer of the 1,728-bit data is completed, a latch signal LA input via the signal line S3 latches the data in the shift register into the latch circuit. The respective latched 1,728-bit data are delivered to the corresponding AND gates A-A1,728.

Strobe signals STB1-STB4 which are a block drive signal are delivered sequentially via the signal lines B1-B4 to the respective blocks of the AND gates A1-A1,728, thereby opening and closing the respective blocks of the AND gates A1-A1,728 sequentially. This causes the record data signal DIN to be delivered sequentially to the respective blocks of the AND gates A1-A1,728. This in turn causes the respective heater elements to generate heat in accordance with the corresponding data signals to record all the data in one line.

The drive circuit which drives the thermal head has a structure such as shown in FIG. 2.

In the same figure, reference numeral 200 denotes on output IC which is connected with a central processing unit (CPU) (not shown) which controls the whole recording apparatus. The output IC is controlled by a control signal CONT input via a signal line 201 from the CPU. Also, it is supplied with a record data signal having a predetermined number of parallel bits, DATA.

The output IC has first-third output ports 203-205. The first output port 203 is connected to a P/S converter 206 which converts the parallel recorded data signal DATA into the series recorded data signal DIN and outputs the signal DIN to the thermal head. The second output port 204 is connected with a shift clock controller 207 which outputs the above-mentioned shift clock signal SCLK to the thermal head and outputs a clock signal CLK which is the same as the clock signal SCLK to the P/S converter 206. The second output port 204 also outputs the latch signal LA to the thermal head. The third output port 205 is connected to a strobe amplifier 208 which amplifies the above-mentioned strobe signals STB1-4 output from the port 205 and which outputs the amplified output to the thermal head.

The drive circuit which has the above structure operates as follows.

First, the output IC 200 takes parallel record data signal DATA as it stands, input via the data bus 202, into the output port 203 in accordance with control signal CONT.

The second output port 204 outputs a control signal to instruct a P/S conversion to the P/S converter 206, thereby causing same to take in the parallel record data signal DATA from the first port 203.

Next, the second output port 204 delivers a control signal to the shift clock controller 207 to actuate same. This causes clock signal CLK to be output to the P/S converter 206 which then performs the P/S conversion of the signal DATA in accordance with the clock signal CLK, thereby outputting the series record data DIN from the P/S converter 206 to the thermal head. At the same time, shift clock signal SCLK is outputted to the thermal head, thereby causing the record data to be taken in and shifted at the shift register. When transfer of the 1,728-bit record data to the shift register is completed by repetition of the 1,728-bit record data, the output IC 200 outputs latch signal LA from the second output port 204 to the thermal head, thereby causing the latch circuit to latch the data.

The output IC 200 then outputs strobe signals STB1-4 from the third output port 205 to the strobe amplifier 208 which then amplifiers the strobe signals and supplies them to the thermal head in order to record the data, as mentioned above. The strobe signals STB1-4 take the form of a pulse, the width of which corresponds to the time for which each of the heater elements R1-R1,728 of the thermal head is supplied with electric power. The width of the pulse is also set to such a value that an appropriate record density is obtained as that each heater element is not overheated.

The arrangement is such that the whole drive operation is controlled by the software for the CPU.

According to such a structure, however, for example, temporary interruption of the input voltages, external noise imposed on the input voltages or a lightning surge, may cause the CPU to lose control. As a result, the strobe signals STB1-4 may be of d.c. output, so that the time for which the heater elements are supplied with electric power becomes longer. This degrades the quality of the recorded image, and in an extreme case, heater elements are damaged.

The above drawbacks are not only in the above thermal-sensitive printers, but also in other recording devices, such as ink jet printers, in which a plurality of recording elements each are driven by the logical product of the record data signal and the drive signal.

SUMMARY OF THE INVENTION

It is an object of the present invention to provide a recording apparatus which is free of the above drawbacks.

It is another object of the present invention to provide a recording apparatus in which recording elements are not damaged even if the central processing unit lose control.

Other objects of the present invention will be apparent from the drawings and the following detailed description of a preferred embodiment of the present invention.

DETAILED DESCRIPTION OF THE PREFERRED EMBODIMENT

Now, an embodiment of the present invention in which the structure of the present invention is applied to a thermal-sensitive printer will be described with respect to FIGS. 3-5.

Figure 1:
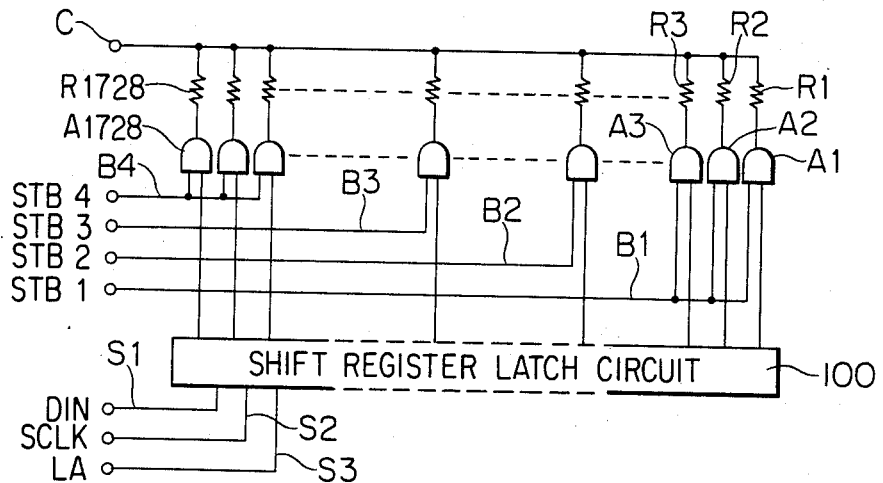
FIG. 1 is a block diagram showing the circuit structure of a prior art thermal head with a drive therefor.

In the particular embodiment, as a thermal head, a thermal head with a driver which has the same structure as the prior art shown in FIG. 1 is used.

Figure 2:
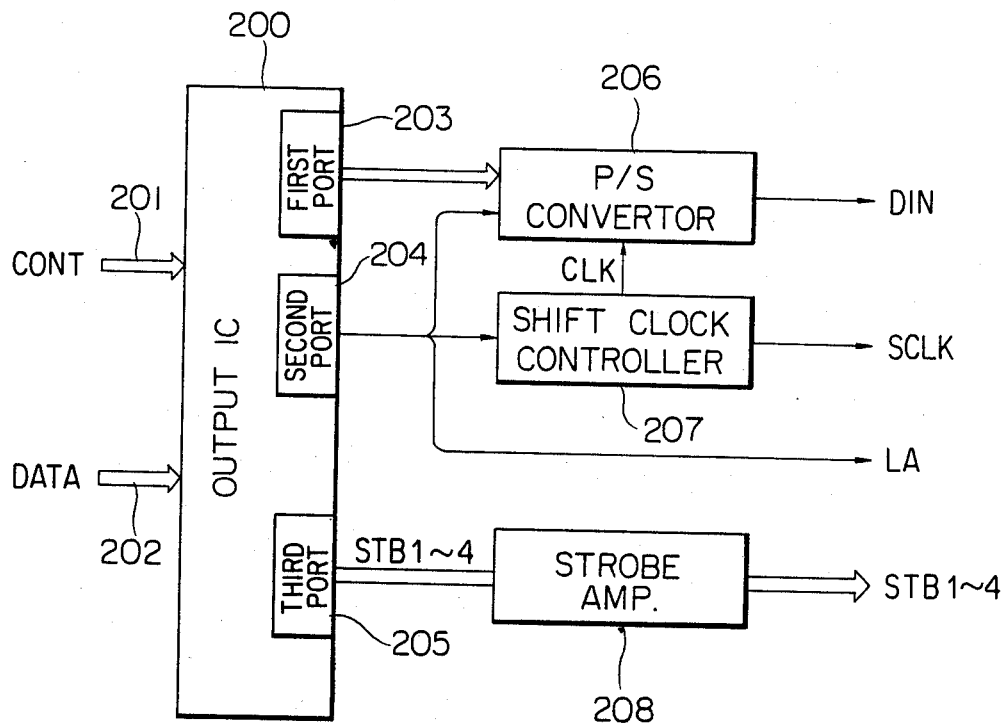
FIG. 2 is a block diagram showing the structure of a prior art drive circuit which drives the thermal head of FIG. 1.
Figure 3:
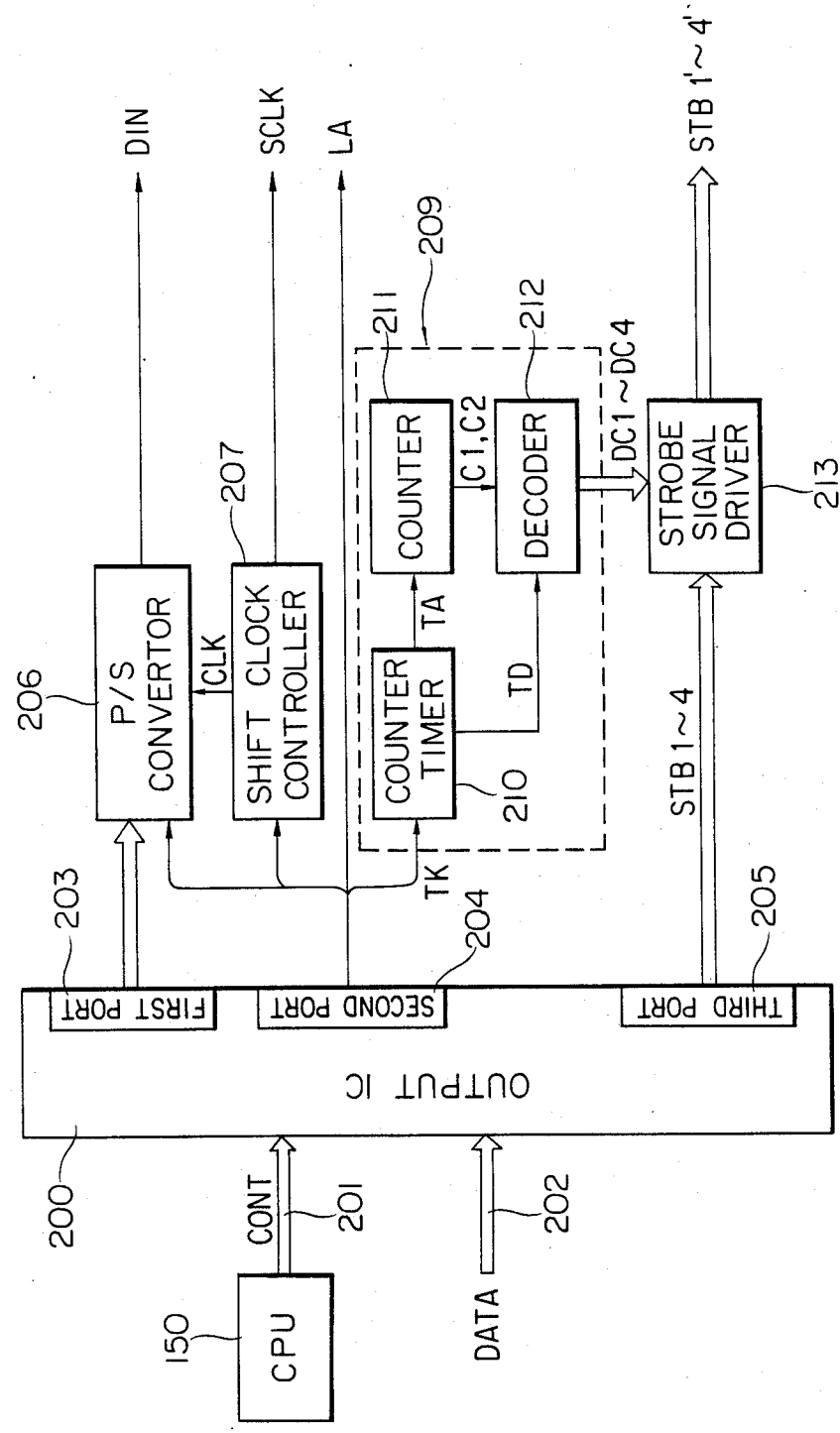
FIG. 3 is a block diagram showing the structure of a drive circuit for the thermal head according to the embodiment of the present invention.

FIG. 3 illustrates the structure of a drive circuit for the thermal head according to the particular embodiment. In the figure, the same part of the structure as in FIG. 2 is given the same reference numeral, and a description of those parts is omitted. Reference numeral 150 denotes a central processing unit (CPU) operated by software.

As shown in the same figure, the drive circuit of the particular embodiment is different from the prior art in that it includes a protection circuit denoted by reference numeral 209 and a strobe signal driver 213 instead of the prior art strobe amplifier.

The protection circuit 209 is composed of a counter timer 210, a counter 211 and a decoder 212. The counter timer (referred to as the timer hereinafter) 210 is connected with the second port 204 of the output IC 200. The decoder 212 is connected with a strobe signal driver 213.

The timer 210 clocks a predetermined time which limits the pulse width of the strobe signals STB1 to 4. It receives a timer start signal TK from the second output port 204 of the output IC 200 and starts to clock the predetermined time. The timer 210 outputs a highlevel timer-in-operation signal TD to the decoder 212 until the predetermined time elapses, at which time a time-up signal TA which is a pulse signal having a predetermined extremely narrow width is output to the counter 211. Then, immediately after the time-up signal TA, the clocking of the predetermined time is started again and the above operation is repeated.

The predetermined time, i.e. the pulse width of the timer-in-operation signal TD, corresponds to that of the strobe signals STB1-4, i.e. the time for which each of the heater elements R1-R1,728 is once supplied with electric power, and is set to such a predetermined time that appropriate density records are obtained and that no heater elements are overheated. Also, the timing of the timer-in-operation signal TD is set to be the same as those of the strobe signals STB1-4.

On the other hand, the counter 211 is composed so as to count the number of time-up signals TA and output to the decoder 212 count signals C1, C2 each of which is a parallel 2-bit signal with binary levels which first to fourth cyclically indicates an ordinal number corresponding to the number of time-up signals TA counted.

The decoder 212 is composed so as to sequentially distribute the timer-in-operation signal TD input from the timer 210 as serial parallel 4-bit decorder output signals DC 1-4 to the strobe signal driver 213.

The decoder output signals DC 1-4 correspond in timing to normal strobe signals STB 1-4 which are output from the third output port 205 of the output IC to the strobe signal driver 213. The pulse width of the decoder output signals DC 1-4 correspond to the widest one of the pulse widths of the strobe signals STB 1-STB 4. The pulse widths of the strobe signals can be controlled so as to vary depending upon the temperature of the thermal head, for example. The strobe signal driver 213 is composed so as to output the logical products of the respective strobe signals STB 1-4 and the respective decoder output signals DC 1-4 as strobe signals 1'-4' to the thermal head.

Figure 5:
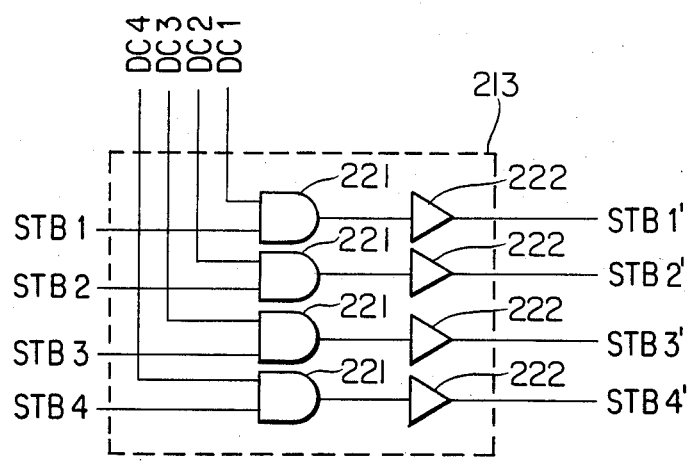
FIG. 5 illustrates the details of a strobe signal driver.

FIG. 5 illustrates the detailed circuit of the strobe signal driver 213 which is composed of 4 AND gates 221 and 4 amplifiers 222. In the driver 213, a respective one of the signal combinations STB 1 and DC 1; STB 2 and DC 2; STB 3 and DC 3; and STB 4 and DC 4 is input to the corresponding one of the AND gates 221. The AND gates 221 each provide the logical product of inputs thereto. Signals indicative of the logical products are amplified by the amplifier to a level enough to drive the thermal head, thereby resulting in drive signals STB 1'-STB 4'.

The operation of the particular embodiment having the above structure will now be described with respect to FIG. 4 which is a timing chart of the respective signals at the protection circuit 209 in operation.

The drive circuit of the particular embodiment transfers 1,728-bit record data to the shift register latch circuit 100 where the data is latched. These operations are the same as the operations of the prior art.

Figure 4:
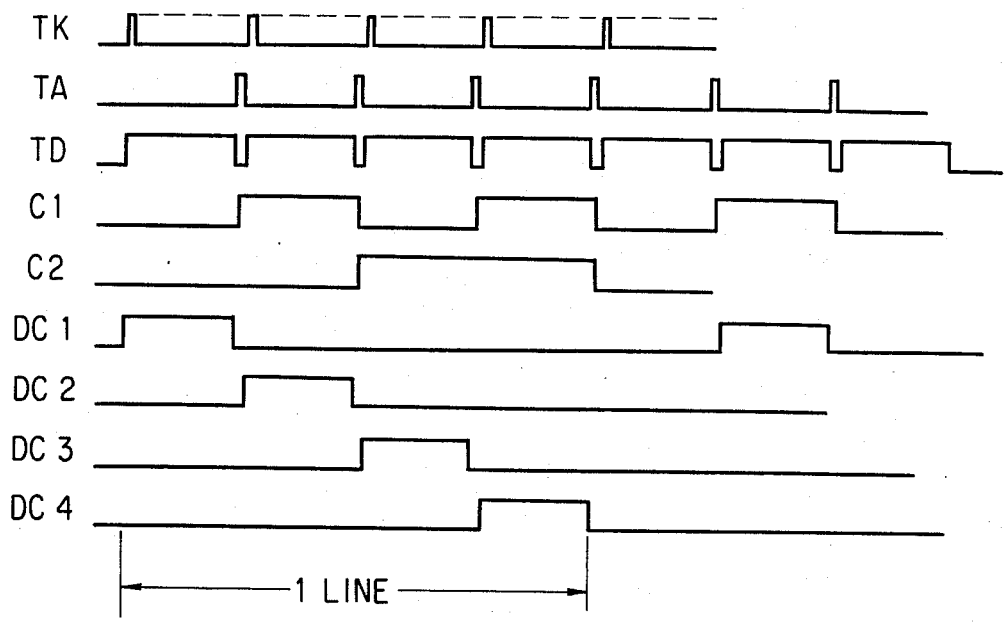
FIG. 4 is a timing chart showing signals at the respective parts of a protection circuit of the FIG. 3 drive circuit when the protection circuit is operating.

Immediately after latching has completed, a timer start signal TK such as shown at the uppermost stage of FIG. 4 is produced from the second output port 204 of the output IC to the timer 210.

In response to the signal TK, the timer 210 alternately outputs timer-in-operation signal TD and time-up signal TA to the decoder 212 and the counter 211, as shown in the third and second stages of FIG. 4.

Count signals C1, C2 output from the counter 211 to the decoder 212 change depending upon the number of input time-up signals TA, as shown at the fourth and fifth stages of FIG. 4 where the first to fourth cyclical ordinal numbers of the timer-in-operation signals TD are shown by bi-level 2-bit indication.

The decoder 213 sequentially outputs parallel 4-bit decoder output signals DC 1-4 to the AND gates 221 of the strobe signal driver 213 in accordance with the ordinal numbers indicated by the count signals C1, C2, as shown at the sixth to the ninth stages of FIG. 4.

When there is no problem with the CPU, strobe signals STB 1-4 which have the same timings and pulse widths as the decoder output signals DC 1-4 are sequentially input from the third output port 205 to the strobe signal driver 213 which then outputs the logical product of the respective decoder output signals DC 1-4 and the respective strobe signals STB 1-4 as strobe signals STB 1'-4' to the thermal head, thereby causing same to perform record operation in the same way as mentioned above. That is, application of strobe signals STB 1'-4' causes the four blocks of heater elements R1-R1,728 in one line of the thermal head to be driven sequentially, thereby performing record operation for one line.

Even if the CPU loses control and runs wild, even if the timer start signal TK takes the D.C. state, as shown by dotted lines in FIG. 4, or even if the respective strobe signals STB 1-4 output from the third port 205 of the output IC to the strobe signal driver 213 take the d.c. state, the timer 210 operates in the same way as mentioned above, once it is started, so that it outputs timer-in-operation signal TD and time-up signal TA alternately, in quite the same way as mentioned above.

Thus, the counter 211 also outputs count signals C1, C2 in quite the same way as mentioned above. This causes the decoder 212 to output decoder output signals DC 1-DC 4 to the strobe signal driver 213 in quite the same way as mentioned above.

Since the strobe driver 213 outputs the logical product of the decoder output signals DC 1-DC 4 and the strobe signals STB 1-4 to the thermal head as the strobe signals STB 1'-4', the output strobe signals STB 1'-4' take the same waveform as the decoder output signals DC 1-DC 4, i.e. normal strobe signals STB 1-4 even if the input strobe signals STB 1-4 take the D.C. state.

Thus, in the thermal head, drive of the respective heater elements R1-R1,728 is performed in the same manner as in the normal state, so that normal recording is performed without damaging the heater elements R1-R1,728 and degrading the quality of recorded images.

Even when the number of heater elements R1-R1,728 and the number of blocks in the above structure vary from the above, the present invention is applicable to the structure. In that case, the counter and the decoder may be constituted appropriately so as to suit the number of blocks. The present invention is also applicable to a structure in which the number of heater elements which constitute each block is 1(unity) and which a drive signal is delivered to each heater element.

In addition, the present invention is applicable not only to thermal-sensitive printers, but also to all the recording apparatus of the type which drives the plurality of recording elements with signals each indicative of the logical product of a recorded data signal and a drive signal.

As is clear from the above description, according to the present invention, since a hardware circuit which limits the width of the drive signal to within a predetermined value is provided in the recording apparatus of the above type, damage to the recording elements and degradation of the quality of recorded images which would otherwise occur when the control unit runs wild are prevented, which is an excellent advantage of the present invention.

The present invention is not limited to the above embodiment, and can be modified into various applications within the scope of claims.

What is claimed is:

1. A recording-apparatus comprising:
   record means including a plurality of recording elements for recording on a record medium;
   control means including means for generating time division drive signals to drive said plurality of recording elements sequentially such that the driving time period of said recording elements is controlled thereby; and
   gate signal generation means for generating a plurality of time division gate signals when an abnormality in the control means impairs the time division drive signals, wherein said plurality of recording elements are driven by the time division gate signals when the abnormality occurs in said control means such that the driving time period of said recording elements is controlled thereby.

2. A recording apparatus according to claim 1, wherein said gate signal generation means includes a hardware timer circuit for producing the time division gate signals at a predetermined interval.

3. A recording apparatus according to claim 2, further including a plurality of logical product circuits for operating the logical product of the time division gate signals and the time division drive signals, and the output of said logical product circuits is applied to said recording elements.

4. A recording apparatus according to claim 1, wherein said recording elements include a thermal recording head.

5. A recording apparatus comprising:
   record means for recording on a record medium;
   control means operated by software, including means for generating a drive signal to drive said record means intermittently within a predetermined time interval; and
   hardware circuit means for limiting the duration of the drive signal to the predetermined time interval when an abnormality in said control means impairs the drive signal whereby recording can continue.

6. A recording apparatus according to claim 5, wherein said hardware circuit means includes a timer circuit.

7. A recording apparatus according to claim 6, wherein said hardware circuit means includes a logical product circuit for operating the logical product of the output of said timer circuit and the drive signal, and the output of said logical product circuit is applied to said record means.

8. A recording apparatus according to claim 5, wherein said record means includes a thermal recording head.

9. A recording apparatus according to claim 5, wherein said record means includes a plurality of recording elements.

10. A recording apparatus according to claim 9, wherein said plurality of recording elements are driven by the drive signals on a time division basis.

* * * * *

UNITED STATES PATENT AND TRADEMARK OFFICE
CERTIFICATE OF CORRECTION

PATENT NO. : 4,623,899

DATED : November 18, 1986

INVENTOR(S) : KENZO SAKAKIBARA

It is certified that error appears in the above-identified patent and that said Letters Patent is hereby corrected as shown below:

IN THE ABSTRACT:

Line 3, "that which drives" should read --that generates a drive signal which drives--.

Column 1, line 59, "on" should read --an--.

Column 2, line 42, "amplifiers" should read --amplifies--; and
line 58, "d.c." should read --D.C.--.

Column 3, line 8, "lose" should read --loses--; and
line 61, "highlevel" should read --high-level--.

Column 5, line 22, "d.c. state" should read --D.C. state--.

Column 6, line 7, "recording-apparatus" should read --recording apparatus--.

Signed and Sealed this

Tenth Day of March, 1987

Attest:

DONALD J. QUIGG

Attesting Officer

Commissioner of Patents and Trademarks